Jan. 12, 1960

W. L. TAYLOR 2,921,158

PNEUMATIC CONTROL VALVE

Filed Sept. 8, 1958

Inventor
WESLEY L. TAYLOR by Hill, Sherman, Meroni, Gross & Simpson Attys.

Jan. 12, 1960 W. L. TAYLOR 2,921,158
PNEUMATIC CONTROL VALVE
Filed Sept. 8, 1958 2 Sheets-Sheet 2
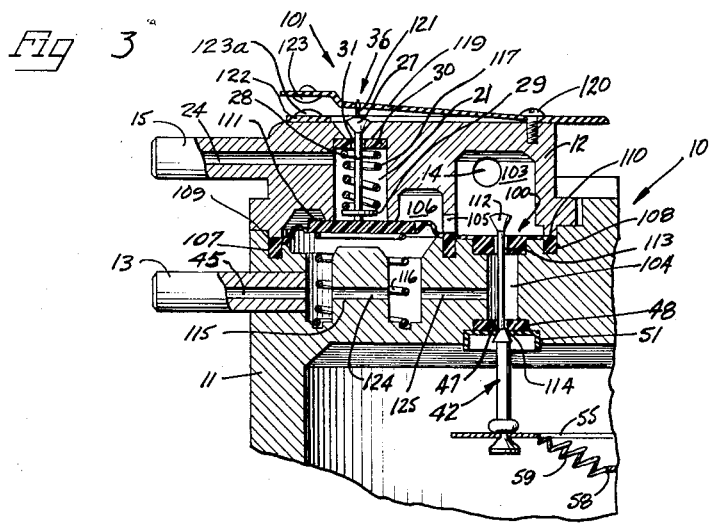
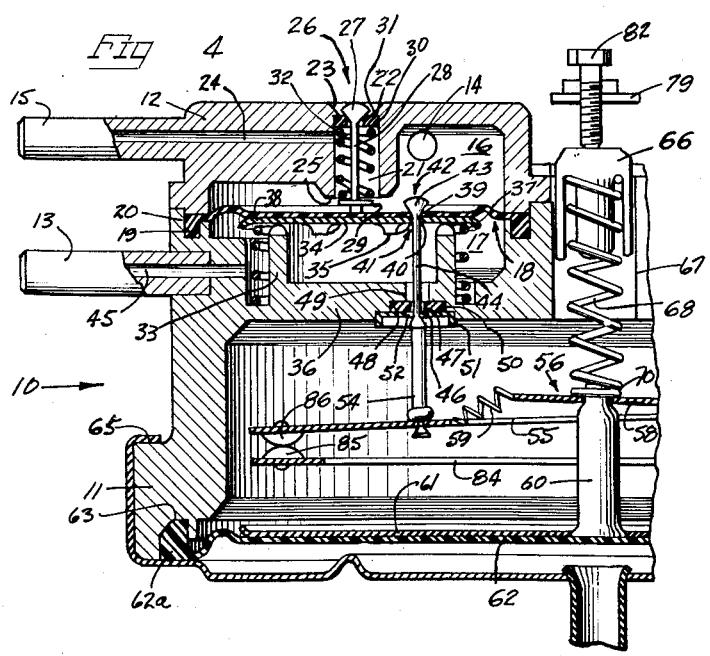
Inventor
WESLEY L. TAYLOR
by Hill, Sherman, Meroni, Gross & Simpson Attys.

United States Patent Office 2,921,158
Patented Jan. 12, 1960

2,921,158

PNEUMATIC CONTROL VALVE

Wesley L. Taylor, Glenview, Ill., assignor to The Dole Valve Company, Morton Grove, Ill., a corporation of Illinois Application September 8, 1958, Serial No. 759,806

23 Claims. (Cl. 200—83)

This invention relates to control valves and more particularly relates to fluid control valves which are arranged to be pneumatically actuated.

In recent times there has been an increasing usage of mechanisms which are designed to be pneumatically or electro-pneumatically actuated such, for instance, as mixing valves and agitator mechanisms in washing machines. Since it is obviously quite expensive to provide separate control valves for each of the pneumatically actuatable mechanisms within a device such as a washing machine, it has been found desirable to provide a single central pneumatic fluid control valve for controlling the actuation of each of a plurality of pneumatically actuatable mechanisms.

Since applicant's valve is particularly adapted for use in controlling the operation of washing machines, the following description is directed to such a usage of this valve but it will, of course, be understood that applicant's control valve is not limited to such usage and that it may be adapted for use in association with a multiplicity of devices to render various control functions.

Accordingly, applicant provides a pneumatic control valve having an air inlet and a pair of air outlets and a movable valve member arranged to selectively communicate the inlet with one or more of the outlets. In applicant's particular control valve, which is hereinafter more fully disclosed, an apertured movable diaphragm is disposed intermediate each of a pair of outlets and is movable in one direction to close communication between the inlet and a first outlet and is movable in another direction to open communication between the inlet and the first outlet. A reciprocably movable valve member is cooperable with the aperture within the diaphragm and is reciprocably movable to open and close communication between the inlet and a second outlet.

The movable diaphragm disposed intermediate each of the outlets is arranged to be moved by differential fluid force acting on opposite sides of the diaphragm and the magnitude of the pressure differential is controlled by movement of the reciprocable valve member.

The valve member which is cooperable with the aperture within the above mentioned diaphragm is itself adapted to be moved by the snap lever of a snap action mechanism which, in turn, is controllably moved by a second pneumatically movable diaphragm. The second diaphragm is moved in one direction by a spring member and in the opposite direction against the biasing force of the spring member by a pneumatic pressure communicated to one side of the diaphragm by a pressure transmitting element as a function of the weight and consequently the level of the water within a washing machine tub.

It will further hereafter be noted that applicant has provided a means for opening and closing a pair of contacts for an electrical circuit which may run to a timer motor itself adapted to control the duration of the agitating cycle. The electric switch is an integral part of the snap acting mechanism and includes a movable contact blade which is moved into and out of juxtaposition with a stationary contact blade by the reciprocable movement of the second diaphragm mentioned above.

Accordingly, it is a principal object of the present invention to provide a pneumatic control valve for controlling the actuation of a plurality of pneumatically actuatable mechanisms.

It is another object of the present invention to provide a pneumatic control valve having a single inlet and a plurality of outlets and pneumatically actuatable means arranged to communicate the inlet with one or more of the outlets.

A further object of the present invention is to provide a fluid control valve of the type above described wherein an apertured reciprocably movable fluid pressure actuated diaphragm is arranged to selectively communicate an inlet with at least one of a plurality of outlets and to simultaneously close communication between the inlet and at least another of a plurality of outlets.

A still further object of the present invention is to provide an electro-pneumatic control valve of the type above described which is adapted to control the actuation of pneumatically and electrically actuatable devices.

Yet another object of the present invention is to provide a pneumatic control valve of the type described which may be readily and economically manufactured.

These and other objects of the present invention will become apparent from time to time as the following specification proceeds and with reference to the appended drawings wherein:

Figure 3 is a fragmentary vertical sectional view through a second embodiment of the present invention; and Figure 4 is a fragmentary vertical sectional view through the control valve illustrated in Figure 1 which is similar in nature to Figure 2 but which shows the working parts of the control valve in a second position.

Figure 1:
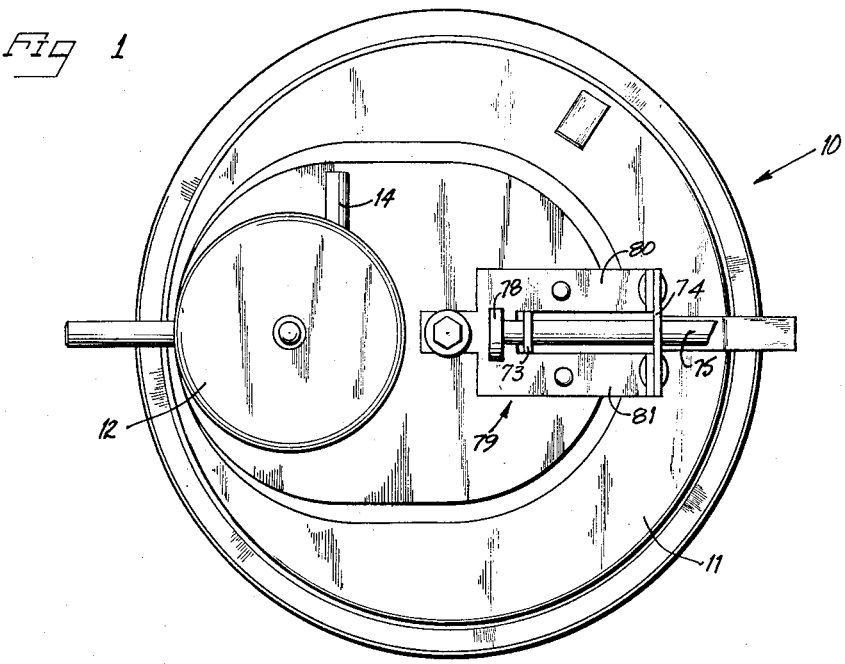
Figure 1 is a plan view of a pneumatic control valve constructed in accordance with the principles of the present invention.
Figure 2:
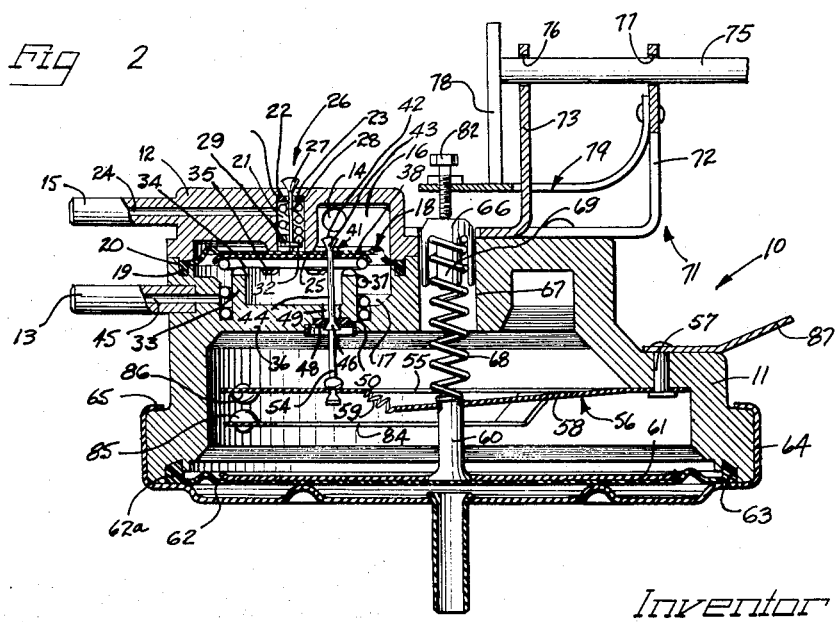
Figure 2 is a vertical sectional view through the control valve illustrated in Figure 1 and showing the working valve parts in one position.

In the embodiment of the invention illustrated in Figures 1, 2, and 4 there is shown a pneumatic control valve 10 including a valve body 11 and a valve head 12. An outlet 13 leads from the valve body 11 and an inlet 14 and an outlet 15 are formed integrally with and lead from the valve head 12.

The hollow interiors or chambers 16 and 17 of the valve head and the valve body, respectively, are formed in registry with one another and are separated by a pneumatically movable diaphragm 18 which is interposed therebetween. The diaphragm 18 has an annular bead or lip 19 formed about the periphery thereof which is adapted to be snugly seated within an annular channel or groove 20 formed within the valve body 11 concentrically with the chamber 17. As will be particularly noted in Figures 2 and 4 the valve head 12 seats on the upper surface of the bead 19 to positively maintain the annular bead within the channel or groove 20.

A vertically extending outlet bore 21 is formed within the valve 12 and terminates in an annular shoulder 22 which defines a chamfered vent port 23 opening from the bore 21 to the atmosphere. The outlet bore 21, in turn, is communicable with an outlet passageway 24 formed within the outlet fitting 15.

The diaphragm 18 is cooperable with a seat 25 defining the outlet bore 21 to control air flow from the inlet 14 to the outlet 15.

A valve member 26 comprising a valve head 27 and a stem 28 is positioned within the outlet bore 21 and has an annular disk 29 secured to the lower end of the stem 28. A resilient washer 30 having an aperture 31 formed centrally therein is snugly seated within the outlet bore 21 against the annular shoulder 22 defining the chamfered outlet port 23 and is maintained in engagement therewith by the preload of a spring member 32 which is interposed between the annular disk 29 and the washer 30.

It will be understood that the diameter of the stem 28 is considerably less than the diameter of the aperture 31 within the resilient washer 30 and that the spring member 32 acting against the annular disk 29 acts to maintain the lower end of the stem 28 in engagement with the reciprocably movable diaphragm 18. It will further be understood that the length of the stem 28 of the valve member 26 is such that when the diaphragm 18 is in the position illustrated in Figure 4, out of engagement with the annular seat 25, the conical face of the valve head 27 is maintained in seating engagement with the wall portion of the washer 30 defining the aperture 31 by the biasing force of spring member 32 so that air is communicated from the inlet 14 through the outlet bore 21 to the outlet passageway 24 within the outlet fitting 15. When, on the other hand, the diaphragm 18 is in the position illustrated in Figure 2 the valve member 26 is moved upwardly within the outlet bore 21 against the biasing force of spring member 32 to unseat the valve head 27 from the aperture 31 within the resilient washer 30 to simultaneously vent the passageway 24 within the outlet fitting 15 to the atmosphere and to close communication between the inlet 14 and the outlet bore 21.

An annular wall 33 which has its upper annular lip 34 notched as at 35 extends upwardly from a lateral wall 36 of the valve body 11 and is formed integrally therewith concentric with the outlet bore 21. A compression spring 37 is seated on the lateral wall 36 about the annular wall 33 and abuts, at the upper end thereof, a stiffening plate 38 which is bonded or otherwise suitably secured to the central portion of the diaphragm 18 overlying the annular wall 33.

Apertures 39 and 40 are formed within the diaphragm 18 and the stiffening plate 38, respectively, in registry with one another and constitute a diaphragm port 41 through which air may pass from the chamber 16 to the chamber 17. A valve member 42 including a conical valve head 43 and a shank 44 is slidably movable within the diaphragm port 41 and is cooperable therewith to control fluid flow therethrough in a manner which will hereinafter be more fully described in detail. It will be understood that the valve member 42 like the valve member 26 is so formed that the shank 44 thereof is diametrically smaller than the diameter of the diaphragm port 41 so that when the valve member is in the position illustrated in Figure 2 having its conical valve head unseated from the port air may freely pass from the chamber 16 to the chamber 17.

Thus, when the valve parts move to the position illustrated in Figure 2 air will enter the inlet 14 and pass into the chamber 16 and thence through the diaphragm port 41 to the chamber 17 where it will be directly communicated to a passageway 45 formed within the outlet fitting 13. No air will pass from the chamber 16 to the outlet bore 21 since the diaphragm 18 will be moved into engagement with the annular seat 25 defining the outlet bore 21 by the biasing force of spring member 37, which is somewhat greater than the biasing force of opposing spring member 32. Thus, the diaphragm 18 will move upwardly to seat against the annular seat 25 and the valve member 26 will simultaneously be moved upwardly against the biasing force of spring member 32 so that the conical valve face 27 of the valve member 26 will be moved out of engagement with the aperture within the washer 22. In this manner, pressurized air will be communicated to the outlet fitting 13 from the inlet 14 and the outlet 15 will be vented to the atmosphere through the aperture 31 within the washer 30.

It will be noted that the shank 44 is movably positioned within an aperture 49 in the lateral wall 36 and that a resilient washer 48 is snugly seated within a counterbore 50 formed within the lower surface of the lateral wall 36 concentrically of the aperture 49. A metallic fitting 51 having an aperture 52 diametrically greater than the aperture 47 is press-fitted into a second counterbore and serves to maintain the washer 48 in fluid tight engagement with the wall of the counterbore 50.

A second conically shaped valve head 46 is formed at the lower end of the shank 44 and it is so spaced from the valve head 43 that it is cooperable with the aperture 47 in the washer 48 to shut off air flow therethrough when the valve member 42 has moved upwardly within aperture 49. However, when the valve member 42 has been moved downwardly to the position illustrated in Figure 4 the valve head 43 will be cooperable with the diaphragm port 41 to shut off air flow therethrough and the valve head 46 will have moved out of engagement with the resilient washer 48 to communicate the interior of the chamber 17 with the large hollowed interior 52 of the valve body 11 which, in turn, is vented to the atmosphere through a vent port (not shown). Thus, when the valve member 42 has been moved downwardly a sufficient distance to seat the valve head 43 within the diaphragm port 41 the valve head 46 will be moved out of engagement with the aperture in the washer 48 and the outlet 13 will be communicable with the atmosphere through the passageway 45, the notches 35, the apertures 49 and 47, and the hollow interior 52 of the valve body 11 and through the bleed passages (not shown). As a result, air pressure will be built up within the chamber 16 from the inlet 14 and the combined downward force of the spring member 32 and the pressurized air within the chamber 16 will be sufficient to move the diaphragm 18 out of engagement with the seat 25 to the position illustrated in Figure 4 wherein the stiffening plate 38 bonded to the diaphragm 18 is seated upon the annular lip 34. Accordingly, pressurized air will then be directly communicated to the passageway 24 within the outlet fitting 15 through the outlet bore 21.

It will now become apparent that the valve member 42 is mechanically actuated in the following manner: the valve member 42 has a stem 54 depending therefrom which is suitably connected to a snap lever 55 of a snap action mechanism 56 adjacent the outer free end of the lever 55. One end of the snap lever 55 is rigidly secured to the valve body 11 of the pressure switch 10 by a rivet 57 so that the outer free end thereof has relative freedom of movement. A snap blade 58 is formed integrally with the snap lever 55 and is somewhat shorter than the lever 55 and is so arranged that the outer free end thereof has relative freedom of movement with respect to the snap lever 55.

In a manner which is well known in the art the outer free end of the snap blade 58 is connected to the free end of the snap lever 55 by an overcenter spring 59 so that movement of the snap blade 58 above the plane of the snap lever 55 will cause the snap lever 55 to snap downwardly. Conversely, as the snap blade 58 moves downwardly past the plane of the snap lever 55 the lever 55 will be snapped upwardly again to the position which is illustrated in Figure 2 by the overcenter spring 59.

A motion translation rod or guide post 60 has its radially reduced upper end portion 70 received within an aperture in the snap blade 58 and is connected at its lower end portion to a supporting plate 61 which is bonded or otherwise suitably secured to a flexible annular diaphragm 62 which, in turn, is peripherally seated within an annular groove 63 in the valve body 11. An enclosure plate 64 is fitted about the lower end of the valve body 11 and has its peripheral edge bent over an annular flange 65 formed on the outer surface of the valve body 11 to positively maintain the bead 62a of the diaphragm 62 in seating engagement within the annular groove 63.

A slidable reaction member 66 is positioned within a bore 67 formed within the valve body 11 concentrically with the post 60 and is arranged to provide an adjustable abutment for a spring member 68 which encircles a guide post formed centrally thereon and which also abuts the snap blade 58 and encircles the radially reduced upper end portion 70 of the guide post 60.

A mounting bracket 71 including a pair of upturned legs 72 and a third centrally positioned leg 73 spaced therefrom is mounted on the upper surface of the valve body 11 and has a bridge 74 integrally formed with and interconnecting the upper end portions of the upturned legs 72. A cam shaft 75 is journaled for rotatable movement in aligned apertures 76 and 77 in the legs 73 and 72, respectively, and has a cam 78 mounted on the inner end thereof which is adapted to operatively engage a spring steel plate 79 which has legs 80 and 81 affixed to the legs 72.

It will be noted that an adjustment screw 82 is threadedly mounted in the free end of the spring steel plate 79 and that the shank of the screw is adapted to abut the slidably movable reaction member 66. Thus, by rotatably moving the cam shaft 75 the cam 78 will act through the plate 79 and the adjustment screw 82 to raise and lower the reaction member 66 within the bore 67 to thereby adjustably increase or decrease the biasing force of the spring member 68 tending to maintain the snap blade 58 and the diaphragm 62 in the position illustrated in Figure 2.

Referring most particularly to Figures 2 and 4, a contact blade 84 is shown as being positioned within the hollow interior of the valve body 11 and as having a contact button 85 secured to the free end thereof and disposed directly beneath a similar contact button 86 which is affixed to the free end portion of the snap lever 55. One end of the contact blade 84, like one end of the snap lever 55 is riveted to the valve body 11 by a rivet which is formed of electrically conductive material and which further extends through and secures a connecting tab, like the connecting tab 87 illustrated in Figure 2 to the valve body. In this manner an electrical switch has been provided within the pressure switch 10 which may be adapted to control the actuation of any electrically operated device such, for instance, as a timer motor for an agitator mechanism in a washing machine.

If, for illustrative purposes, it be assumed that the outlet 13 is connected to a pneumatically actuatable mixing valve adapted to fill a washing machine tub and the outlet fitting 15 is connected to an agitator mechanism for the washing machine and the electrical switch including the contacts 85 and 86 is arranged to control the electrical actuation of a timer mechanism for the agitator mechanism the operation of the pressure switch will be as follows:

When the machine is started and the parts of the control valve are in the position illustrated in Figure 2, air under pressure will be directed through the inlet 14 and will flow through diaphragm port 41 to the outlet 13 and thence to the pneumatically actuatable mixing valve to open the valve to thereby direct water to the washing machine tub. As the weight and thereby the level of water within the washing machine tub increases pneumatic pressure on the underside of the diaphragm 62 will increase due to the functioning of a pressure transmitting device, not shown, until it begins to overcome the oppositely directed biasing force of spring member 68. When the pneumatic pressure on the underside of the diaphragm 62 does begin to overcome the biasing force of spring 68 the diaphragm 62 will begin to move upwardly within the hollow interior of the valve body 11 until the snap blade 58 is moved above the planar axis of the snap lever 55. At this time the overcenter spring 59 will tend to quickly snap the blade 58 upwardly and the lever 55 downwardly within the hollow interior of the valve body 11 to thereby bring the contacts 85 and 86 into contact with one another to close the electrical energizing circuit to the timer motor for the agitator mechanism. Simultaneously, the downward movement of the lever 55 will move the valve member 42 downwardly within the diaphragm port 41 and the aperture 47 to thereby shut off fluid flow through the diaphragm port 41 and to communicate the chamber 17 with the atmospherically vented hollow interior of the valve body 11 through the aperture 47.

Upon closure of the diaphragm port 41 and upon opening of the aperture 47 pneumatic pressure will build up within the chamber 16 above the diaphragm 18 and this pneumatic pressure in combination with the biasing force of spring member 32 will be effective to move the diaphragm 18 downwardly within the valve block 12 out of engagement with the seat 25 and into engagement with the annular lip 34 to thereby simultaneously deactuate the mixing valve by shutting off pressurized air flow thereto and pneumatically actuate the agitator mechanism by directing pressurized air through the passageway 24.

When the timer mechanism has cycled to the position to shut off the agitator mechanism and to drain the water from the washing machine tub the air pressure on the undersurface of the diaphragm 62 will become reduced and the biasing force of spring member 68 will then be sufficient to move the diaphragm 62 downwardly within the hollow interior of the valve body 11 to the initial position illustrated in Figure 2. Such downward movement of the diaphragm 62 will cause the snap blade 58 and lever 55 to again be snapped to the position illustrated in Figure 2 by the overcenter spring 59 to thereby operatively move the valve member 42 into the position illustrated therein wherein air flow through the aperture 47 is closed and air flow through the port 41 is open. Upon opening of the diaphragm port 41 pressurized air will be communicated from the chamber 16 to the chamber 17 to thereby equalize the pressure on opposite sides of the diaphragm so that the larger spring member 39 will be effective to move the diaphragm 18 upwardly against the biasing force of smaller spring member 32 to thereby return the diaphragm 18, and the valve member 26 to their initial positions.

Accordingly, the desired water level within the washing machine tub may be selectively varied by rotatable movement of the cam 78 through the cam shaft 75 and the operating knob (not shown) connected thereto to thereby vary the biasing force of spring member 68 acting downwardly on the diaphragm 62 and opposing upward movement thereof. Thus, by rotating the cam shaft 75 to move the free end of the plate 79, having the adjusting screw 82 mounted therein, downwardly the biasing force acting against the diaphragm 62 will be increased so that a higher water level must be attained in the washing machine tub before the fluid pressure communicated therefrom to the underside of the diaphragm 62 will snap the various parts to the position illustrated in Figure 4 to shut off fluid flow to the tub and to initiate the agitating cycle. Conversely, adjustable movement of the cam 78 to move the adjusting screw 82 upwardly with respect to the bore 67 will permit the motion translation member 66 to move upwardly within the bore 67 to thereby decrease the biasing force opposing the upward movement of the diaphragm 62 so that the snap blade and snap lever 58 and 55, respectively, will snap to the position illustrated in Figure 4 when the weight and consequently the level of water within the washing machine tub is comparatively low.

In the embodiment of the invention illustrated in Figure 3 the pressure switch 10 is shown as including a remote pilot 100 and as having an electrical switch 101 mounted on the upper outer surface of the valve head 12, In this particular embodiment of the invention the pressure switch 10 is shown as including an inlet 14 and an outlet 15 in the valve head 12 and as including an outlet 13 in the valve body 11. The inlet 14 is shown as opening to an inlet chamber 103 which, in turn, opens to a vent bore 104. A passage 105 serves to communicate the inlet chamber 103 with a diaphragm chamber 106. Annular grooves 107 and 108 extend peripherally about the chambers 106 and 103, respectively, and are arranged to receive the peripheral beads or lips 109 and 110 of a flexible integral diaphragm 111.

In this particular embodiment of the invention a valve member 42 which is identical in construction with the valve member 42 illustrated in Figures 2 and 4 is arranged to move reciprocably within the vent bore 104 and has a valve member 112 at the upper end thereof which is cooperable with an aperture 113 formed concentrically with the bore 104 in the diaphragm 111 to control air flow therethrough. The valve member 42 also has a valve face 114 spaced apart from and below the valve face 112 which is cooperable with a central aperture 47 in a resilient washer 48 which is secured within the valve body at the lower end of the bore 104 by a member 51 in a manner similar to that described with respect to the washer 47 illustrated in Figures 2 and 4.

A boss 115 is formed integrally with the valve body 11 and extends upwardly within the diaphragm chamber 106 and forms a guide for a spring member 116 which abuts, at one end thereof, the lateral wall 36 and which abuts, at the other end thereof, the diaphragm 111. The biasing force of spring member 116 is opposed by the biasing force of a spring member 117 which acts through the shank 28 and the annular disk 29 mounted thereon of valve member 26 to urge the diaphragm 111 downwardly within the chamber 106. Like the valve 26 illustrated in Figures 2 and 4 the valve member illustrated in Figure 3 has a valve face 27 which is cooperable with an aperture 31 in resilient washer 30 to control air flow therethrough from the outlet bore 21 to the atmosphere. In this particular embodiment of the invention, however, a movable contact blade 119 of electrical switch 101 is secured to the upper surface of the valve block 12 by a screw 120 and is connected adjacent the free end thereof to the valve member 26 by a connecting pin 121. A stationary contact blade 122 is disposed on the upper surface of the valve block 12 and has a contact button 123a on the outer free end thereof disposed below the contact button 123 on the movable blade 121 so that upon downward movement of the valve member 26 within the outlet bore 21 the movable contact 121 will be moved into engagement with the stationary contact 122 to thereby close an electrical energizing circuit.

It will further be noted that passages 124 and 125 extend through the boss 115 and the valve body 11 and are formed in alignment with one another to thereby constantly communicate the interior of the vent bore 104, intermediate the washer 48 and the diaphragm 111, with the outlet 13.

Thus, assuming that the outlets 15 and 13 are connected to a pneumatically actuatable agitator mechanism and a pneumatically actuatable mixing valve or shut off valve, respectively, the operation of a pressure switch constructed in accordance with this particular embodiment of the invention will be as follows: When the washing machine motor is started and the working parts of the control valve are in the positions illustrated in Figure 3, pressurized air will be directed to the inlet chamber 103 through the inlet 14 and will flow through the aperture 113 in the diaphragm 111 to the bore 104 and thence through passages 125 and 124 and about boss 115 to the passageway 45 within the outlet fitting 13 to thereby actuate the mixing or shut off valve associated with the washing machine to thereby initiate the filling of the washing machine tub. As has hereinbefore previously been noted, when the tub has been filled to the desired level, pressurized air will be communicated to the underside of the liquid level sensing diaphragm (not shown) to thereby snap the blade 58 and the lever 55 through the action of the overcenter spring 59 to the opposite positions from those illustrated in Figure 3 to move the valve face 112 on the valve member 42 into sealing engagement with the aperture 113 in the diaphragm 111 and to consequently move the valve face 114 out of engagement with the aperture 47 in the resilient washer 48.

Closure of the aperture 113 will shut off air flow from the chamber 103 to the bore 104 so that pneumatic pressure will build up within the chambers 103 and 106 to the pressure of the air entering the inlet 14. Since pressurized air on the undersurface of the diaphragm 111 will be bled to the atmosphere through passage 125, bore 104, aperture 47 and the bleed passage (not shown) extending through the wall of the valve body 11 from the large hollow interior thereof, the combined downward force of the spring member 117 and the pressurized air within chamber 106 will move the diaphragm 11 downwardly within the diaphragm chamber out of engagement with the seat 25 and into engagement with the boss 115. In this manner the passageway 24 within the outlet fitting 15 will be communicated with the inlet 14 through the bore 117, the chamber 106, the passage 105, and the chamber 103. The valve member 26 will, of course, be moved downwardly with the diaphragm 111 by the biasing force of spring member 117 acting against the annular disk 29. Such downward movement of valve member 26 will move the valve face 27 on the upper end thereof into engagement with the wall portion of the washer 30 defining the aperture 31 to thereby shut off air flow from the bore 21 to the atmosphere.

Furthermore, downward movement of the valve member 26 will move the contact button on the movable contact blade 119 into engagement with the contact 123a on the stationary contact 122 to thereby close an electrical energizing circuit to the agitator timer mechanism.

When the valve member 42 is moved upwardly within the bore 104 by the lever 55 in the manner hereinbefore described, pressurized air within chambers 106 and 103 will be communicated to the passage 125 through the aperture 113 to thereby equalize the pressure on opposite sides of the diaphragm 111. The flexible diaphragm 111 will then be returned to the position illustrated in Figure 3 by the biasing force of spring member 116 acting against the smaller opposing force of biasing spring 117. The various parts of the mechanism will then have been returned to their initial position and passageway 24 will be open to the atmosphere through aperture 31 and bleed passage 47 in resilient washer 48 will be closed by valve face 114.

It will be understood that these embodiments of the invention have been used for illustrative purposes only and that various modifications and variations of the present invention may be effected without departing from the spirit and scope of the novel concepts thereof.

I claim as my invention:

1. A fluid control valve comprising a hollow valve body having an inlet leading thereinto and spaced outlets leading therefrom, a bore within said valve body communicable with at least one of said outlets, a seat defining one end of said bore, a movable apertured diaphragm extending across the hollow interior of said valve body intermediate at least two of said outlets and cooperable with said seat to control fluid flow into said bore from said inlet, and valve means cooperable with the aperture within said diaphragm to control the flow of fluid from said inlet to another of said outlets.

2. A fluid control valve comprising a hollow valve body having a movable apertured diaphragm therein extending across a hollow interior of said valve body and dividing the hollow interior into first and second fluid chambers, a fluid inlet leading into said first chamber, a fluid outlet leading from said second chamber, an outlet from said first chamber defined by a diaphragm seat, means for controllably moving said diaphragm with respect to said seat to control fluid flow from said inlet to said second mentioned outlet, and valve means cooperable with the aperture within said diaphragm to control the flow of fluid from said inlet to said first mentioned outlet.

3. A fluid control valve comprising a hollow valve body having a movable apertured diaphragm therein extending across a hollow interior of said valve body and dividing the hollow interior into first and second fluid chambers, a fluid inlet leading into said first chamber, a fluid outlet leading from said second chamber, an outlet from said first chamber defined by a diaphragm seat, means for controllably moving said diaphragm with respect to said seat to control fluid flow from said inlet to said second mentioned outlet, a vent port leading from said second mentioned outlet, means for opening and closing said vent port as the diaphragm moves into and out of engagement with said seat respectively, valve means cooperable with the aperture within said diaphragm to control the flow of fluid from said inlet to said first mentioned outlet, a second vent port leading from said second chamber, and means for opening and closing said second vent port as said valve means closes and opens the aperture within said diaphragm respectively.

4. A fluid control valve comprising a hollow valve body having an apertured movable wall therein dividing a hollow interior of said valve body into first and second fluid chambers, an inlet leading into said first chamber, first and second fluid outlets leading from said first and second fluid chambers respectively, a seat within said first chamber defining said first outlet, valve means cooperable with the aperture within said movable wall to control fluid flow therethrough, and biasing means urging said movable wall into sealing engagement with said seat to shut off fluid flow from said inlet to said first mentioned outlet when said valve means is unseated from the aperture within said movable wall.

5. A fluid control valve comprising a hollow valve body having an apertured movable diaphragm therein dividing a hollow interior of said valve body into first and second fluid chambers, an inlet leading into said first chamber, first and second fluid outlets leading from said first and second chambers respectively, a seat within said first chamber defining said first outlet, a reciprocably movable valve member cooperable with the aperture in said diaphragm to control fluid flow therethrough, and spring means biasing said diaphragm into engagement with said seat when said valve member is out of sealing engagement with the aperture within said diaphragm.

6. A fluid control valve comprising a hollow valve body having an inlet leading thereinto and spaced outlets leading therefrom, a bore within said valve body communicable with the first of said outlets, a seat defining one end of said bore, a flexible diaphragm peripherally seated on said valve body and dividing a hollow interior of said valve body into first and second fluid chambers communicable respectively with said first and second mentioned outlets, said inlet opening to said first fluid chamber, a port within said diaphragm, valve means cooperable with said port to control fluid flow therethrough between said first and said second fluid chambers, and spring means urging said diaphragm into sealing engagement with said seat.

7. A fluid control valve comprising a hollow valve body having an inlet leading thereinto and spaced outlets leading therefrom, a bore within said valve body communicable with the first of said outlets, a seat defining one end of said bore, a flexible diaphragm peripherally seated on said valve body and dividing a hollow interior of said valve body into first and second fluid chambers communicable respectively with said first and second mentioned outlets, said inlet opening to said first fluid chamber, a port within said diaphragm, valve means cooperable with said port to control fluid flow therethrough between said first and said second fluid chambers, spring means urging said diaphragm into sealing engagement with said seat, and second valve means for selectively venting said second fluid chamber to the atmosphere.

8. A fluid control valve comprising a hollow valve body having an inlet leading thereinto and spaced outlets leading therefrom, a bore within said valve body communicable with the first of said outlets, a seat defining one end of said bore, a flexible diaphragm peripherally seated on said valve body and dividing a hollow interior of said valve body into first and second fluid chambers communicable respectively with said first and said second mentioned outlets, said inlet opening to said first fluid chamber, a port within said diaphragm, valve means cooperable with said port to control fluid flow therethrough between said first and said second fluid chambers, spring means urging said diaphragm into sealing engagement with said seat, a vent port leading from said bore, second valve means cooperable with said vent port to control fluid flow therethrough, a second vent port leading from said second fluid chamber, and third valve means cooperable with said second vent port to control fluid flow therethrough.

9. A fluid control valve comprising a hollow valve body having an inlet leading thereinto and spaced outlets leading therefrom, a bore within said valve body communicable with the first of said outlets, a seat defining one end of said bore, a flexible diaphragm peripherally seated on said valve body and dividing a hollow interior of said valve body into first and second fluid chambers communicable with said first and said second mentioned outlets respectively, said inlet opening to said first fluid chamber, a port within said diaphragm, a reciprocably movable valve member cooperable with said port to control fluid flow therethrough between said first and said second fluid chambers, spring means urging said diaphragm into sealing engagement wtih said seat, a snap lever connected at one end thereof to said valve body and at a free end thereof to said valve member, a snap blade operatively associated with said snap lever connected at one end thereof to said valve body, an over-center spring interconnecting the free end portions of said snap blade and said snap lever operable to maintain said blade and said lever in spaced relation from one another, and means for effecting movement of said snap blade past the plane of said snap lever to move said valve member into and out of engagement with said port.

10. A fluid control valve comprising a hollow valve body having an inlet leading thereinto and spaced outlets leading therefrom, a bore within said valve body communicable with the first of said outlets, a seat defining one end of said bore, a flexible diaphragm peripherally seated on said valve body and dividing a hollow interior of said valve body into first and second fluid chambers communicable respectively with said first and said second mentioned outlets, said inlet opening to said first fluid chamber, a port within said diaphragm, a reciprocably movable valve member cooperable with said port to control fluid flow therethrough between said first and said second fluid chambers, spring means urging said diaphragm into sealing engagement with said seat, a snap lever connected at one end thereof to said valve body and at a free end thereof to said valve member and having an electrical connecting tab connected thereto and extending out of said valve body, a snap blade operatively associated with said snap lever connected to said valve body, a contact blade connected to said valve body having a free end disposed adjacent the free end of said snap lever and having an electrical connecting tab connected thereto and protruding outside of said valve body, each of said connecting tabs being adapted to be connected to an electrical energizing circuit, an overcenter spring interconnecting the free end portions of said snap blade and said snap lever to urge the free ends thereof in opposed directions, and means for effecting movement of said snap blade past the plane of said snap lever to move said valve member into and out of engagement with the port within said diaphragm and to move the free ends of said snap lever and said contact blade into engagement with one another in one position to close an electrical circuit and in another position to open an electrical circuit.

11. A fluid control valve comprising a hollow valve body having an inlet leading thereinto and spaced outlets leading therefrom, a bore within said valve body communicable with the first of said outlets, a seat defining one end of said bore, a flexible diaphragm peripherally seated on said valve body and dividing a hollow interior of said valve body into first and second fluid chambers communicable respectively with said first and said second mentioned outlets, said inlet opening to said first fluid chamber, a port within said diaphragm, a reciprocably movable valve member cooperable with said port to control fluid flow therethrough between said first and said second fluid chambers, biasing means urging said diaphragm into sealing engagement with said seat, a vent port leading from said bore, first valve means for controlling fluid flow through said vent port, a second vent port leading from said second chamber, second valve means for controlling fluid flow through said second vent port, a snap lever connected at one end to said valve body and at a free end thereof to said valve member, a snap blade operatively associated with said snap lever connected at one end thereof to said valve body, an overcenter spring interconnecting the free end portions of said snap blade and said snap lever operable to maintain said blade and said lever in spaced relation from one another, and means for effecting movement of said snap blade past the plane of said snap lever to move said valve member into and out of engagement with the port within said diaphragm.

12. A fluid control valve comprising a hollow valve body having an inlet leading thereinto and spaced outlets leading therefrom, a bore within said valve body communicable with the first of said outlets, a seat defining one end of said bore, a flexible diaphragm peripherally seated on said valve body and dividing a hollow interior of said valve body into first and second fluid chambers communicable respectively with said first and second mentioned outlets, said inlet opening to said first fluid chamber, a port within said diaphragm, a reciprocably movable valve member cooperable with said port to control fluid flow therethrough between said first and said second fluid chambers, biasing means urging said diaphragm into sealing engagement with said seat, a vent port leading from said bore, first valve means for controlling fluid flow through said vent port, a second vent port leading from said second chamber, second valve means for controlling fluid flow through said second vent port, a snap lever connected to said valve body and at a free end thereof to said valve member and being electrically connected to an electrical connecting tab extending out of said valve body, a snap blade operatively associated with said snap lever connected at one end thereof to said valve body, a contact blade connected to said valve body having a free end disposed adjacent the free end of said snap lever and being electrically connected to an electrical connecting tab protruding out of said valve body, each of said protruding electrical connecting tabs being adapted to be connected to an electrical energizing circuit, an overcenter spring interconnecting the free end portions of said snap blade and said snap lever to urge the free ends thereof in opposed direction, and means for effecting movement of said snap blade past the plane of said snap lever to move said valve member into and out of engagement with the fluid passageway within said diaphragm and to move the free ends of said snap lever and said contact blade into engagement with one another one position to close an electrical circuit and to move the free ends of said snap lever and said contact blade out of engagement with one another in another position to open an electrical circuit.

13. A fluid control valve comprising hollow valve body having an inlet leading thereinto and spaced outlets leading therefrom, a bore within said valve body communicable with the first of said outlets, a seat defining one end of said bore, a diaphragm seated on said valve body including a flexible wall portion and an integral non-movable wall portion, said flexible wall portion dividing a hollow interior of said valve body into first and second fluid chambers communicable respectively with said first and said second mentioned outlets, a third fluid chamber formed on one side of said non-movable wall portion of said diaphragm communicable with said inlet and with said first fluid chamber, a vent bore formed on the opposite side of said non-movable wall portion of said diaphragm communicable with said second fluid chamber, a port within said non-movable wall portion of said diaphragm, a reciprocably movable valve member cooperable with said port to control fluid flow therethrough between said third fluid chamber and said vent bore, biasing means urging said movable wall portion of said diaphragm into sealing engagement with said seat, a snap lever connected at one end thereof to said valve body and at a free end thereof to said valve member, a snap blade operatively associated with said snap lever connected at one end thereof to said valve body, an overcenter spring interconnecting the free end portions of said snap blade and said snap lever operable to maintain said blade and said lever in spaced relation from one another, and means for effecting movement of said snap blade past the plane of said snap lever to move said valve member into and out of engagement with the port within said non-movable wall portion of said diaphragm.

14. A fluid control valve comprising a hollow valve body having an inlet leading thereinto and spaced outlets leading therefrom, a bore within said valve body communicable with the first of said outlets, a seat defining one end of said bore, a diaphragm seated on said valve body including a flexible wall portion and an integral non-movable wall portion, said flexible wall portion dividing a hollow interior of said valve body into first and second fluid chambers communicable respectively with said first and said second mentioned outlets, a third fluid chamber formed on one side of said non-movable wall portion of said diaphragm communicable with said inlet and said first fluid chamber, a vent bore formed on the opposite side of said non-movable wall portion of said diaphragm within said valve body communicable with said second fluid chamber, a reciprocably movable valve member cooperable with said port to control fluid flow therethrough between said third fluid chamber and said vent port, biasing means urging said diaphragm into sealing engagement with said seat, a vent port leading from said first mentioned bore, valve means cooperable with said vent port to control fluid flow therethrough, a second vent port leading from said vent bore, second valve means cooperable with said second vent port for controlling fluid flow therethrough, a snap lever connected at one end thereof to said valve body and at the free end thereof to said valve member, a snap blade operatively associated with said snap lever connected at one end thereof to said valve body, an overcenter spring interconnecting the free end portions of said snap blade and said snap lever operable to maintain said blade and said lever in spaced relation from one another, and means for effecting movement of said snap blade past the plane of said snap lever to move said valve member into and out of engagement with the aperture within said diaphragm.

15. A fluid control valve comprising a hollow valve body having an inlet leading thereinto and spaced outlets leading therefrom, a bore within said valve body communicable with the first of said outlets, a seat defining one end of said bore, a diaphragm seated on said valve body including a flexible wall portion and an integral non-movable wall portion, said flexible wall portion dividing a hollow interior of said valve body into first and second fluid chambers communicable respectively with said first and said second mentioned outlets, a third fluid chamber formed on one side of said non-movable wall portion of said diaphragm communicable with said inlet and said first fluid chamber, a vent bore formed on the opposite side of said non-movable wall portion of said diaphragm within said valve body communicable with said second fluid chamber, a reciprocably movable valve member cooperable with said port to control fluid flow therethrough between said third fluid chamber and said vent port, biasing means urging said diaphragm into sealing engagement with said seat, a vent port leading from said first mentioned bore, valve means cooperable with said vent port to control fluid flow therethrough, a second vent port leading from said vent bore, and second valve means cooperable with said second vent port for controlling fluid flow therethrough.

16. A fluid control valve comprising a hollow valve body having an inlet leading thereinto and spaced outlets leading therefrom, a bore within said valve body communicable with the first of said outlets, a seat defining one end of said bore, a diaphragm seated on said valve body including a flexible wall portion and an integral non-movable wall portion, said flexible wall portion dividing a hollow interior of said valve body into first and second fluid chambers communicable respectively with said first and said second mentioned outlets, a third fluid chamber formed on one side of said non-movable wall portion of said diaphragm, a vent bore formed on the opposite side of said non-movable wall portion of said diaphragm communicable with said second fluid chamber, a port within said non-movable wall portion of said diaphragm, a reciprocably movable valve member cooperable with said port to control fluid flow therethrough between said third fluid chamber and said vent bore, biasing means urging said diaphragm into sealing engagement with said seat, a stationary electrical contact blade mounted on said valve body, a movable electrical contact blade mounted on said valve body disposed adjacent said stationary contact blade, and a motion translation member interconnecting said movable wall portion of said diaphragm with said movable contact blade to move said movable contact blade into and out of engagement with said stationary contact blade upon reciprocable movement of said movable wall portion of said diaphragm.

17. A fluid control valve comprising a hollow valve body having an inlet leading thereinto and spaced outlets leading therefrom, a bore within said valve body communicable with the first of said outlets, a seat defining one end of said bore, a diaphragm seated on said valve body including a flexible wall portion and an integral non-movable wall portion, said flexible wall portion dividing a hollow interior of said valve body into first and second fluid chambers communicable respectively with said first and said second mentioned outlets, a third fluid chamber formed on one side of said non-movable wall portion of said diaphragm communicable with said inlet and said first fluid chamber, a vent bore formed on the opposite side of said non-movable wall portion of said diaphragm communicable with said second fluid chamber, a port within said non-movable wall portion of said diaphragm, a second reciprocably movable valve member cooperable with said port to control fluid flow therethrough between said third fluid chamber and said vent bore, biasing means urging said diaphragm into sealing engagement with said seat, a second vent port leading from said first mentioned bore, valve means cooperable with said second vent port to control fluid flow therethrough, a third vent port leading from said vent bore, a valve face on said first mentioned reciprocably movable valve member cooperable with said third mentioned vent port to control fluid flow therethrough, a stationary electrical contact mounted on said valve body, a movable electrical contact mounted on said valve body connected to said second mentioned reciprocably movable valve member, a snap lever connected at one end thereof to said valve body and at a free end thereof to said first mentioned valve member, a snap blade operatively associated with said snap lever connected at one end thereof to said valve body, an overcenter spring interconnecting the free end portions of said snap blade and said snap lever operable to maintain said blade and said lever in spaced relation from one another, and means for effecting movement of said snap blade past the plane of said snap lever to move said first mentioned valve member into and out of engagement with the port within said non-movable wall portion of said diaphragm.

18. A fluid control valve comprising a hollow valve body having an inlet leading thereinto and spaced outlets leading therefrom, a bore within said valve body communicable with the first of said outlets, a seat defining one end of said bore, a flexible diaphragm peripherally seated on said valve body and dividing a hollow interior of said valve body into first and second fluid chambers communicable respectively with said first and said second mentioned outlets, said inlet opening to said first fluid chamber, a port within said diaphragm, valve means cooperable with said port to control fluid flow therethrough between said first and said second fluid chambers, spring means urging said diaphragm into sealing engagement with said seat, a vent port leading from said bore, second valve means cooperable with said vent port to control fluid flow therethrough, a motion translation member interconnecting said first valve means with said diaphragm to move said first valve means in a port opening direction as said diaphragm moves into sealing engagement with said seat, a second vent port leading from said second fluid chamber, and third valve means cooperable with said second vent port to control fluid flow therethrough.

19. A fluid control valve comprising a hollow valve body having an inlet leading thereinto and spaced outlets leading therefrom, a bore within said valve body communicable with the first of said outlets, a seat defining one end of said bore, a flexible diaphragm peripherally seated on said valve body and dividing a hollow interior of said valve body into first and second fluid chambers communicable respectively with said first and said second mentioned outlets, said inlet opening to said first fluid chamber, a port within said diaphragm, a reciprocably movable valve member cooperable with said port to control fluid flow therethrough between said first and said second fluid chambers, biasing means urging said diaphragm into sealing engagement with said seat, a vent port leading from said bore, first valve means for controlling fluid flow through said vent port, a motion translation member interconnecting said first valve means with said diaphragm to move said first valve means in a port opening direction as said diaphragm moves into sealing engagement with said seat, a second vent port leading from said second chamber, second valve means for controlling fluid flow through said second vent port, a snap lever connected at one end to said valve body and at a free end thereof to said valve member, a snap blade operatively associated with said snap lever connected at one end thereof to said valve body, an overcenter spring interconnecting the free end portions of said snap blade and said snap lever operable to maintain said blade and said lever in spaced relation from one another, and means for effecting movement of said snap blade past the plane of said snap lever to move said valve member into and out of engagement with the port within said diaphragm, motion translation means interconnecting said second valve means with said snap lever to move said second valve means colinearly with said snap lever.

20. A fluid control valve comprising a hollow valve body having an inlet leading thereinto and spaced outlets leading therefrom, a bore within said valve body communicable with the first of said outlets, a seat defining one end of said bore, a flexible diaphragm peripherally seated on said valve body and dividing a hollow interior of said valve body into first and second fluid chambers communicable respectively with said first and said second mentioned outlets, said inlet opening to said first fluid chamber, a port within said diaphragm, valve means cooperable with said port to control fluid flow therethrough between said first and said second fluid chambers, spring means urging said diaphragm into sealing engagement with said seat, a vent port leading from said bore, second valve means cooperable with said vent port to control fluid flow therethrough, a motion translation member interconnecting said first valve means with said diaphragm to move said first valve means in a port opening direction as said diaphragm moves into sealing engagement with said seat, spring means cooperable with said motion translation member biasing said second valve means in a port closing direction, a second vent port leading from said second fluid chamber, and third valve means cooperable with said second vent port to control fluid flow therethrough.

21. A fluid control valve comprising a hollow valve body having an inlet leading thereinto and spaced outlets leading therefrom, a bore within said valve body communicable with the first of said outlets, a seat defining one end of said bore, a diaphragm seated on said valve body including a flexible wall portion and an integral non-movable wall portion, said flexible wall portion dividing a hollow interior of said valve body into first and second fluid chambers communicable respectively with said first and said second mentioned outlets, a third fluid chamber formed on one side of said non-movable wall portion of said diaphragm communicable with said inlet and with said first fluid chamber, a vent bore formed on the opposite side of said non-movable wall portion of said diaphragm communicable with said second fluid chamber, a port within said non-movable wall portion of said diaphragm, a reciprocably movable valve member cooperable with said port to control fluid flow therethrough between said third fluid chamber and said vent bore, biasing means urging said movable wall portion of said diaphragm into sealing engagement with said seat, and means for effecting reciprocable movement of said valve member.

22. A fluid control valve comprising a hollow valve body having an inlet leading thereinto and spaced outlets leading therefrom, a bore within said valve body communicable with the first of said outlets, a seat defining one end of said bore, a diaphragm seated on said valve body including a flexible wall portion and an integral non-movable wall portion, said flexible wall portion dividing a hollow interior of said valve body into first and second fluid chambers communicable respectively with said first and said second mentioned outlets, a third fluid chamber formed on one side of said non-movable wall portion of said diaphragm communicable with said inlet and said first fluid chamber, a vent bore formed on the opposite side of said non-movable wall portion of said diaphragm communicable with said second fluid chamber, a port within said non-movable wall portion of said diaphragm a second reciprocably movable valve member cooperable with said port to control fluid flow therethrough between said third fluid chamber and said vent bore, biasing means urging said diaphragm into sealing engagement with said seat, a second vent port leading from said first mentioned bore, valve means cooperable with said second vent port to control fluid flow therethrough, a third vent port leading from said vent bore, a valve face on said first mentioned reciprocably movable valve member cooperable with said third mentioned vent port to control fluid flow therethrough a stationary electrical contact mounted on said valve body, a movable electrical contact mounted on said valve body connected to said second mentioned reciprocably movable valve member, and means for effecting reciprocable movement of said valve member.

23. A fluid control valve comprising a hollow valve body having an inlet leading thereinto and spaced outlets leading therefrom a bore within said valve body communicable with the first of said outlets, a seat defining one end of said bore, a diaphragm seated on said valve body including a flexible wall portion and an integral non-movable wall portion, said flexible wall portion dividing a hollow interior of said valve body into first and second fluid chambers communicable respectively with said first and said second mentioned outlets, a third fluid chamber formed on one side of said non-movable wall portion of said diaphragm communicable with said inlet and said first fluid chamber, a vent bore formed on the opposite side of said non-movable wall portion of said diaphragm communicable with said second fluid chamber, a port within said non-movable wall portion of said diaphragm a second reciprocably movable valve member cooperable with said port to control fluid flow therethrough between said third fluid chamber and said vent bore, biasing means urging said diaphragm into sealing engagement with said seat, a second vent port leading from said first mentioned bore, valve means cooperable with said second vent port to control fluid flow therethrough, a motion translation member interconnecting said valve means with said movable wall portion of said diaphragm to move said valve means into a port opening direction when said movable wall portion of said diaphragm moves into sealing engagement with said seat, a third vent port leading from said vent bore, a valve face on said first mentioned reciprocably movable valve member cooperable with said third mentioned vent port to control fluid flow therethrough, a stationary electrical contact mounted on said valve body, a movable electrical contact mounted on said valve body connected to said second mentioned reciprocably movable valve member, and means for effecting reciprocable movement of said valve member.

References Cited in the file of this patent

UNITED STATES PATENTS

| | | |
|---|---|---|
| 418,405 | Gibson | Dec. 31, 1889 |
| 1,722,920 | Hynes | July 30, 1929 |
| 2,286,282 | Joesting | June 16, 1942 |
| 2,537,308 | Hansen | Jan. 9, 1951 |
| 2,590,419 | Koonz et al. | Mar. 25, 1952 |
| 2,636,093 | Clark et al. | Apr. 21, 1953 |